(12) United States Patent
Bernard et al.

(10) Patent No.: US 7,582,382 B2
(45) Date of Patent: Sep. 1, 2009

(54) NON-SINTERED ELECTRODE OF NICKEL HYDROXIDE IN A BINDER OF CELLULOSE COMPOUND AND STYRENE-ACRYLATE CO-POLYMER FOR AN ELECTROCHEMICAL GENERATOR

(75) Inventors: Patrick Bernard, Bordeaux (FR); Lionel Goubault, Merignac (FR)

(73) Assignee: SAFT, SA, Bagnolet (FR)

( * ) Notice: Subject to any disclaimer, the term of this patent is extended or adjusted under 35 U.S.C. 154(b) by 515 days.

(21) Appl. No.: 10/774,614

(22) Filed: Feb. 10, 2004

(65) Prior Publication Data
US 2004/0219427 A1  Nov. 4, 2004

(30) Foreign Application Priority Data
Feb. 11, 2003  (FR) .................... 03 01586

(51) Int. Cl.
*H01M 4/58* (2006.01)
(52) U.S. Cl. ............... 429/223; 429/217; 429/233; 429/218.2
(58) Field of Classification Search .......... 429/232, 429/233, 236, 239, 245, 212, 217, 218.2, 429/223, 231.3, 206

See application file for complete search history.

(56) References Cited

U.S. PATENT DOCUMENTS

| 5,525,444 | A | | 6/1996 | Ito |
| 5,595,841 | A | | 1/1997 | Suzuki |
| 5,824,435 | A | * | 10/1998 | Kawano et al. ............. 429/223 |
| 6,399,246 | B1 | * | 6/2002 | Vandayburg et al. ........ 429/217 |
| RE37,935 | E | * | 12/2002 | Takemura et al. ........... 429/222 |
| 2003/0152834 | A1 | * | 8/2003 | Bernard et al. ........... 429/218.2 |
| 2005/0244712 | A1 | * | 11/2005 | Miyamoto et al. .......... 429/223 |

FOREIGN PATENT DOCUMENTS

| DE | 19709107 | * | 9/1998 |
| EP | 1 244 158 A | | 9/2002 |
| JP | 2000-294230 A | | 10/2000 |

OTHER PUBLICATIONS

Patent Abstracts of Japan, JP 08 264175 (Shin Kobe Electric Mach Co Ltd) dated Oct. 11, 1996.

* cited by examiner

*Primary Examiner*—Raymond Alejandro
(74) *Attorney, Agent, or Firm*—Sughrue Mion, PLLC

(57) ABSTRACT

A non-sintered electrode containing a two-dimensional conductive support covered in a layer containing an electrochemically active material and a binder which is a mixture of a styrene-acrylate copolymer and a cellulose compound chosen from methylcellulose, carboxymethylcellulose, hydroxypropylmethylcellulose, hydroxypropylcellulose and hydroxyethylcellulose. The proportion of the styrene-acrylate copolymer is less than 4% by weight of the active layer.

18 Claims, 1 Drawing Sheet

FIG.
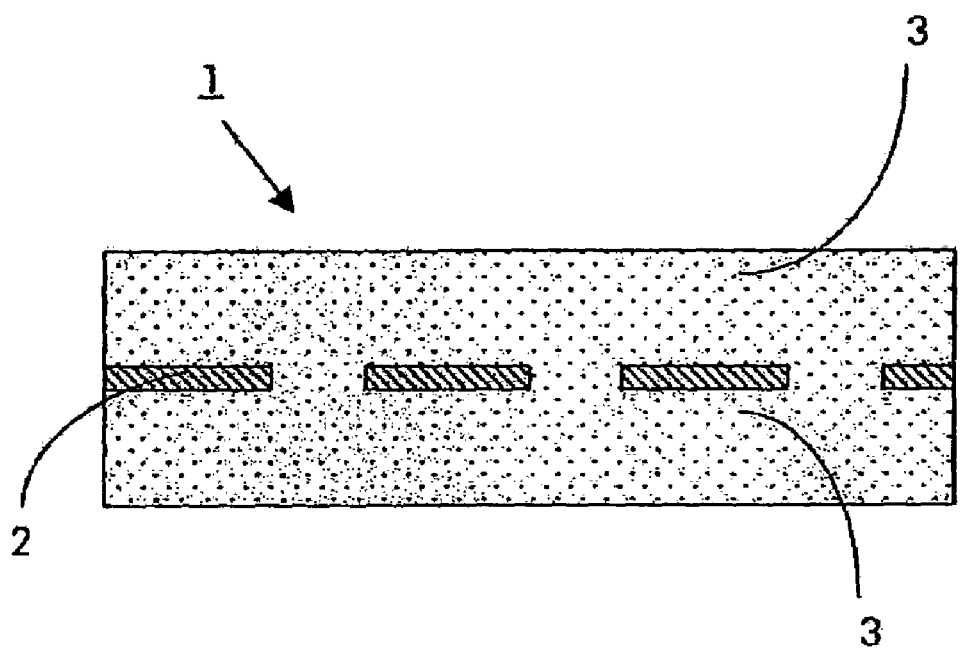

NON-SINTERED ELECTRODE OF NICKEL HYDROXIDE IN A BINDER OF CELLULOSE COMPOUND AND STYRENE-ACRYLATE CO-POLYMER FOR AN ELECTROCHEMICAL GENERATOR

The present invention relates to a non-sintered electrode such as that which is used in secondary electrochemical cells with an alkaline electrolyte, such as for example: nickel/cadmium, nickel/iron, nickel/hydrogen, and nickel/metal hydride storage cells The invention also covers a cell containing such an electrode.

BACKGROUND OF THE INVENTION

There are several types of electrode, in particular sintered and non-sintered electrodes, also called pasted or plasticized electrodes. The electrodes most widely used today are of the non-sintered type. Compared with other electrodes, a non-sintered electrode contains a greater quantity of active material, its volume specific capacity is thus increased and its production cost lower.

A non-sintered electrode consists of a support, serving as current collector, to which is applied a paste containing the active material and a binder, to which a conductive material is most often added. It is usually made by applying the paste in a porous three-dimensional conductive support such as a felt or a foam, made of metal or carbon. For reasons of cost, there is now a move towards the use of two-dimensional conductive supports. The known binders used to produce an electrode with a three-dimensional support prove unsuitable for a two-dimensional support.

By way of example, patent application EP 0 750 358 describes a non-sintered nickel electrode having a support comprising a corrugated metal sheet in which teeth have been formed in order to bind a microscopically rough layer. A paste comprising carboxymethylcellulose (CMC) and a styrene/butadiene (SBR) copolymer is applied to the layer. In that case it was necessary to use means other than the binder to ensure the mechanical strength of the electrode, Also known is German patent application DE 19 709 107 which describes a nickel/metal hydride storage cell including an electrode formed from a paste applied to a substrate. The paste contains an acrylate binder having ester groups with 6 to 15 carbon atoms.

OBJECTS AND SUMMARY OF THE INVENTION

The aim of the present invention is to propose an electrode, presenting mechanical strength and mass specific capacity that are at least equivalent to those of an electrode having a three-dimensional current collector support.

The present invention provides a secondary electrochemical cell, with an alkaline electrolyte, containing a non-sintered electrode comprising a two-dimensional conductive support covered by a layer containing an electrochemically active material and a binder, wherein said binder is a mixture of a cellulose compound and a styrene-acrylate copolymer of general formula:

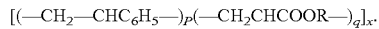

$[(-CH_2-CHC_6H_5-)_p(-CH_2CHCOOR-)_q]_x$.

The styrene-acrylate copolymer is a combination of elementary styrene units ($-CH_2-CHC_6H_5-$) and of elementary acrylic ester or acrylate units ($-CH_2CHCOOR-$).

The proportion of the sytrene-acrylate copolymer is preferably less than 4% by weight of the active layer. When the proportion of styrene-acrylate copolymer is equal to or greater than 4% by weight of the active layer, the mass specific capacity of the electrode reduces perceptibly. In fact, an increase in the proportion of binder in the active layer means a reduction in the quantity of electrochemically active material, which causes a drop in performance.

The proportion of styrene-acrylate copolymer advantageously lies in the range 0.15% to 3% by weight of the active layer. A reduction in the quantity of binder to a value below 0.15% by weight of the active layer does not reduce the capacity, but the mechanical strength of the electrode is degraded.

The cellulose composition can be chosen in particular from methylcellulose (MC), carboxymethylcellulose (CMC), hydroxypropylmethyl-cellulose (HPMC), hydroxypropylcellulose (HPC) and hydroxyethylcellulose (HEC). Carboxymethylcellulose (CMC) is further preferably used. The proportion of the cellulose compound preferably lies in the range 0.1 to 1% by weight of the active layer.

In a particular embodiment of the present invention, the electrochemically active material comprises a nickel hydroxide. This hydroxide preferably has a spheroidal shape and has a grain size lying in the range 7 micrometers ($\mu m$) to 20 $\mu m$.

It is understood that the term "electrochemically active material containing nickel hydroxide" as used in the present application may mean a nickel hydroxide, a hydroxide containing principally nickel, but also a nickel hydroxide containing at least one syncrystallized hydroxide of an element selected from zinc, cadmium, and magnesium, and at least one syncrystallized hydroxide of an element chosen from cobalt, manganese, aluminium, yttrium, calcium, strontium, zirconium, and copper. A syncrystallized hydroxide contained in the nickel hydroxide is a hydroxide forming a solid solution with the nickel hydroxide, i.e. occupying, in continuously variable proportion, the atomic sites defined by the crystal lattice of the nickel hydroxide.

The active material can be covered by a coating based on cobalt oxide or hydroxide optionally containing other elements such as nickel, zinc, aluminum, and/or manganese, or else by a porous metal coating, of nickel for example.

Nickel hydroxide is a poorly conductive compound which needs a conductive material to be added to permit good electric percolation. The active layer also contains a conductive material selected from conductive particles, conductive fibers, and mixtures thereof. The conductive particles may be selected from carbon particles, metal particles, such as nickel for example, or the powder of a compound of a transition metal such as for example Co, CoO, $Co(OH)_2$, the composite oxide of lithium and cobalt $LiCoO_2$ and an oxide of conductive cobalt of a valency greater than 2. Said conductive fibers are selected from carbon fibers, metal fibers, or fibers covered with metal, such as nickel for example.

The active layer preferably contains a conductive compound constituted essentially by a compound of cobalt, preferably metal cobalt Co, cobalt oxide CoO, cobalt hydroxide $Co(OH)_2$, the composite oxide of lithium and cobalt $LiCoO_2$ or an oxide of conductive cobalt of a valency greater than 2.

The proportion of the conductive material in the active layer advantageously lies in the range 3% to 15% by weight of the layer. Beyond this value, the volume specific capacity of the electrode decreases because of the proportional reduction in the quantity of active material.

The active layer may also contain at least one other compound selected from the compounds of zinc such as ZnO or $Zn(OH)_2$, of ytrrium such as $Y_2O_3$ or $Y(OH)_3$, ytterbium such as $Yb_2O_3$ or $Yb(OH)_3$, and calcium such as CaO, $Ca(OH)_2$ or $CaF_2$. This compound is usually added in powder form.

In a first variant, the layer also contains a powder of a compound of yttrium, preferably yttrium oxide $Y_2O_3$ or yttrium hydroxide $Y(OH)_3$.

In a first variant, the layer also contains a powder of a compound of ytterbium, preferably ytterbium oxide $Yb_2O_3$ or ytterbium hydroxide $Y(OH)_3$.

The active layer advantageously also contains polymer fibers, such as for example polypropylene fibers. These fibers preferably have a length of 0.1 millimeters(mm) to 1.5 mm and a diameter of 10 μm to 30 μm. These fibers are intended to increase the mechanical strength of the electrode.

By two-dimensional support is meant a flat support to which a paste is applied which, once dried, will form the active layer. The properties of the binder are thus essential in order to keep the active layer on the support, in particular for an electrode that is rolled up.

Said two-dimensional conductive support may be a solid or a perforated strip, an expanded metal, a grid, or a fabric. It is for example a strip of nickel steel having a thickness of $10^{-2}$ mm to $10^{-1}$ mm, with weight of 0.3 grams per square decimeter (g/dm²) to 6 g/dm², and with a void percentage of 0% and 80%, the diameter of the holes being 0.1 mm to 3 mm.

The present invention also provides a secondary electrochemical cell comprising a positive electrode, a metal-hydride negative electrode, and an aqueous alkaline electrolyte. The negative electrode may comprise in particular an active material selected from cadmium and a hydrogen-fixing alloy.

BRIEF DESCRIPTION OF THE DRAWING

Other characteristics and advantages of the present invention appear in the following description of embodiments which are given by way of non-limiting illustration.

The single FIGURE is a sectional view of an electrode of the invention.

MORE DETAILED DESCRIPTION

The electrode 1 is comprises a plane-form conductive support 2 which fulfils the current collector function. The support 2 is covered by an electrochemically active layer 3 which contains the electrochemically active material and a binder.

EXAMPLE 1

| A first electrode (1) of the invention was produced, the composition by weight of its active layer being: | |
| --- | --- |
| Electrochemically active material based on Ni(OH)$_2$ | 87.2% |
| Conductive material: Co(OH)$_2$ powder | 10% |
| Styrene-acrylate copolymer | 2% |
| Cellulose compound: CMC | 0.3% |
| Y$_2$O$_3$ | 0.5% |

The powdery electrochemically active material comprised a nickel-based hydroxide containing the following additives: cobalt and zinc. The viscosity of the paste was adjusted with water. The paste was homogeneously deposited simultaneously on both sides of a two-dimensional metal support in the form of a 50 μm thick perforated nickel steel strip. The whole is then dried in order to eliminate water, then rolled to the desired thickness, and cut in order to obtain a positive electrode. Once the electrode was finished, the active layer displayed porosity of 30% and a grammage of 16 g/dm².

EXAMPLE 2

| A first comparative electrode (A1) was produced, with an active layer having the following composition by weight: | |
| --- | --- |
| Electrochemically active material based on Ni(OH)$_2$ | 88.2% |
| Conductive material: Co(OH)$_2$ powder | 10% |
| Binder: polytetrafluoroethylene (PTFE) | 1% |
| Cellulose compound: CMC | 0.3% |
| Y$_2$O$_3$ | 0.5% |

The powdery electrochemically active material comprised a nickel-based hydroxide containing the following additives: cobalt and zinc. The viscosity of the paste was adjusted with water. The paste was introduced into a three-dimensional support comprising a nickel foam with a porosity of about 95%. The whole was then dried in order to eliminate water, then rolled to the desired thickness and cut in order to obtain a positive electrode. Once the electrode was finished, the active layer displayed porosity of 30% and weight of 16 g/dm².

EXAMPLE 3

| An electrode (II) of the invention was produced in the manner described in Example 1, with an active layer having the following composition by weight: | |
| --- | --- |
| Electrochemically active material based on Ni(OH)$_2$ | 86.9% |
| Conductive material: Co(OH)$_2$ powder | 10% |
| Styrene-acrylate copolymer | 2% |
| Cellulose compound: CMC | 0.3% |
| Polypropylene fibers | 0.3% |
| Y$_2$O$_3$ | 0.5% |

The powdery electrochemically active material comprised a nickel-based hydroxide containing the following additives: cobalt and zinc. Once the electrode was finished, the active layer displayed porosity of 30% and weight of 16 g/dm².

EXAMPLE 4

| A second comparative electrode (A2) was produced in the manner described in Example 2, with a layer having the following composition by weight: | |
| --- | --- |
| Electrochemically active material based on Ni(OH)$_2$ | 79.9% |
| Conductive material: Co(OH)$_2$ powder | 10% |
| Binder: polytetrafluoroethylene (PTFE) | 1% |
| Cellulose compound: CMC | 0.3% |
| Polypropylene fibers | 0.3% |
| Y$_2$O$_3$ | 0.5% |

The powdery electrochemically active material comprised a nickel-based hydroxide containing the following additives:

cobalt and zinc. Once the electrode was finished, the active layer displayed porosity of 30% and weight of 16 g/dm².

EXAMPLE 5

An electrode (III) of the invention was produced in the manner described in Example 1, with an active layer having the following composition by weight:

| | |
|---|---|
| Electrochemically active material based on Ni(OH)$_2$ | 86.3% |
| Conductive material: Co(OH)$_2$ powder | 10% |
| Styrene-acrylate copolymer | 2.9% |
| Cellulose compound: CMC | 0.3% |
| Y$_2$O$_3$ | 0.5% |

The powdery electrochemically active material comprised a nickel-based hydroxide containing the following additives: cobalt and zinc. Once the electrode was finished, the active layer displayed porosity of 30% and weight of 16 g/dm².

EXAMPLE 6

An electrode (IV) of the invention was produced in the manner described in Example 1, with an active layer having the following composition by weight:

| | |
|---|---|
| Electrochemically active material based on Ni(OH)$_2$ | 84.9% |
| Conductive material: Co(OH)$_2$ powder | 10% |
| Styrene-acrylate copolymer | 4% |
| Cellulose compound: CMC | 0.3% |
| Polypropylene fibers | 0.3% |
| Y$_2$O$_3$ | 0.5% |

The powdery electrochemically active material comprised a nickel-based hydroxide containing the following additives: cobalt and zinc. Once the electrode was finished, the active layer displayed porosity of 30% and weight of 16 g/dm².

EXAMPLE 7

An electrode (IV) of the invention was produced in the manner described in Example 1, with an active layer having the following composition by weight:

| | |
|---|---|
| Electrochemically active material based on Ni(OH)$_2$ | 88.75% |
| Conductive material: Co(OH)$_2$ powder | 10% |
| Styrene-acrylate copolymer | 0.15% |
| Cellulose compound: CMC | 0.3% |
| Polypropylene fibers | 0.3% |
| Y$_2$O$_3$ | 0.5% |

The powdery electrochemically active material comprised a nickel-based hydroxide containing the following additives: cobalt and zinc. Once the electrode was finished, the active layer displayed porosity of 30% and weight of 16 g/dm².

Ni—MH storage cells were assembled, including respectively the previously manufactured electrodes A1, A2 and I to V. Their negative electrodes were of known type having as their electrochemically active material an intermetallic compound capable of forming a hydride once charged. Negative electrode capacity was greater than positive electrode capacity. Each positive electrode was placed beside a negative electrode from which it was isolated by a separator comprising a nonwoven polypropylene fabric in order to form the electrochemical stack. The stack was rolled up and inserted in a metal cup and impregnated with an alkaline electrolyte, which was an aqueous alkaline solution comprising a mixture of 7.5 N potassium hydroxide KOH, 0.4 N sodium hydroxide NaOH, and 0.5 N lithium hydroxide LiOH.

After resting at ambient temperature for 48 hours (h), the storage cells were formed electrically under the following conditions:

| | |
|---|---|
| Cycle 1: | rest 2 h at 85° C.; |
| | charge at 0.1 lc for 4 h at 85° C., where lc is the current needed to discharge the nominal capacity C of the cell in 1 h; |
| | rest 2 h at 20° C.; |
| | charge 3 h at 0.33 lc; |
| | discharge at 0.2 lc to a voltage of 0.9 volts (V); |
| | charge 40 minutes (min) at lc, then 1 h 30 min at 0.5 lc; |
| | discharge at 0.2 lc to a voltage of 0.9 V. |
| Cycles 2 to 10: | charge 16 h at 0.1 lc; |
| | discharge at 0.2 lc to a voltage of 0.9 V; |
| Cycle 11: | charge 72 min at lc; |
| | discharge at lc to a voltage of 0.9 V. |

The mass specific capacities in cycle 11, relative to the mass of coated material, are listed in Table 1 below.

A mechanical strength test of the electrodes A1, A2 and I to V was then carried out as follows: each electrode was weighed, then released from a height of 50 centimeters (cm) onto a plane surface. The drop was repeated 10 times. Then the electrode was weighed again. The result of the test is expressed as the ratio of the initial mass minus the final mass divided by the initial mass. The smaller this ratio, the stronger the electrode. The results obtained are shown in Table 1 below.

The two comparative electrodes A1 and A2 with three-dimensional supports differ only in the presence in the active layer of polymer fibers, the role of which is to increase the mechanical strength of the electrode. These two electrodes behaved in the same way during the mechanical strength test. It should be noted that the mass specific capacity was identical for both comparative electrodes A1 and A2: the presence of 0.3% by weight of fibers in the active layer did not influence the electrochemical performance of the cell.

Similarly, electrodes I and II of the present invention with two-dimensional support differ only in the presence of polymer fibers in the active layer. The capacity obtained in cycle 11 was of the same order for both electrodes I and II, but it can be seen that electrode II had better mechanical strength than electrode I. The presence of 0.3% by weight of fibers in the layer did not influence the electrochemical performance of the cell.

The electrochemical evaluation of the cells assembled with electrodes of the invention shows that electrodes I and II, each including a two-dimensional conductive support and a binder of the invention, present a mass specific capacity at least equal to that of electrodes A1 and A2 with three-dimensional support.

For a greater proportion of styrene-acrylate copolymer (electrode III) the capacity of the electrode reduces slightly. However, the increase in the proportion of binder permitted an improvement in the mechanical strength of the electrode despite the absence of fibers.

If the proportion of styrene-acrylate polymer is further increased (electrode IV), the mass specific capacity of the electrode falls because of the reduction in the quantity of active material.

Electrode V including a smaller proportion of styrene-acrylate copolymer displays a good mass specific capacity, but its degraded mechanical strength makes it more difficult to use.

TABLE 1

|  | electrode | | | | | | |
| --- | --- | --- | --- | --- | --- | --- | --- |
|  | A1 | A2 | I | II | III | IV | V |
| support | foam | foam | strip | strip | strip | strip | strip |
| styrene-acrylate copolymer % | 1% PTFE | 1% PTFE | 2 | 2 | 2.9 | 4 | 0.15 |
| cellulose compound CMC (%) | 0.3 | 0.3 | 0.3 | 0.3 | 0.3 | 0.32 | 0.3 |
| polypropylene fibers (%) | 0.3 | — | — | 0.3 | — | 0.3 | 0.3 |
| mechanical strength of the electrode (%) | 0.2 | 0.2 | 1 | 0.2 | 0.3 | 0.15 | 5.1 |
| cell output in cycle 11 (milliampere-hours per gram (mAh/g) | 239 | 240 | 242 | 245 | 235 | 220 | 244 |

The invention claimed is:

1. A secondary electrochemical cell with an alkaline electrolyte, the cell containing a positive non-sintered electrode comprising a substantially flat plane form two-dimensional conductive support covered in a layer containing nickel hydroxide and a binder, wherein said binder is a mixture of a cellulose compound and a styrene-acrylate copolymer which is a combination of elementary styrene units (—$CH_2CHC_6H_5$—), and of elementary acrylic ester or acrylate units (—$CH_2CHCOOR$—), wherein said two dimensional conductive support has a thickness of between $10^{-2}$ mm and $10^{-1}$ mm.

2. A cell according to claim 1, in which the proportion of said styrene-acrylate copolymer is less than 4% by weight of said layer.

3. A cell according to claim 2, in which the proportion of said styrene-acrylate copolymer lies in the range 0.15% to 3% by weight of said layer.

4. A cell according to claim 1, in which said cellulose compound is selected from methylcellulose, carboxymethyl-cellulose, hydroxypropylmethyl-cellulose, hydroxypropyl-cellulose, and hydroxyethylcellulose.

5. A cell according to claim 1, in which the proportion of said cellulose compound lies in the range 0.1% to 1% by weight of said layer.

6. A cell according to claim 1, in which said nickel hydroxide also contains at least one syncrystallized hydroxide of an element selected from zinc, cadmium, and magnesium, and at least one syncrystallized hydroxide of an element selected from cobalt, manganese, aluminum, yttrium, calcium, strontium, zirconium, copper.

7. A cell according to claim 1, in which said nickel hydroxide has a spheroidal shape and has a grain size lying in the range 7 μm to 20 μm.

8. A cell according to claim 1, in which said layer also comprises a conductive material consisting principally of a compound of cobalt.

9. A cell according to claim 8, in which said compound of cobalt is selected from cobalt metal Co, cobalt oxide CoO, cobalt hydroxide $Co(OH)_2$, the composite oxide of lithium and cobalt $LiCoO_2$, and an oxide of conductive cobalt oxide of a valency greater than 2.

10. A cell according to claim 1, in which said layer also contains at least one other compound selected from the compounds of zinc, yttrium, ytterbium, and calcium.

11. A cell according to claim 10, in which said compound is a compound of yttrium.

12. A cell according to claim 11, in which said compound of yttrium is selected from yttrium oxide $Y_2O_3$ and yttrium hydroxide $Y(OH)_3$.

13. A cell according to claim 10, in which said compound is a compound of ytterbium.

14. A cell according to claim 13, in which said compound of ytterbium is selected from ytterbium oxide $Yb_2O_3$ and ytterbium hydroxide $Yb(OH)_3$.

15. A cell according to claim 1, in which said layer also contains polymer fibers.

16. A cell according to claim 1, in which said two-dimensional conductive support is selected from a solid or a perforated strip, an expanded metal, a grid, and a fabric.

17. A cell according to claim 1, also comprising a metal-hydride negative electrode.

18. A cell according to claim 1, wherein said binder consists of said mixture.

* * * * *